Figure 1:
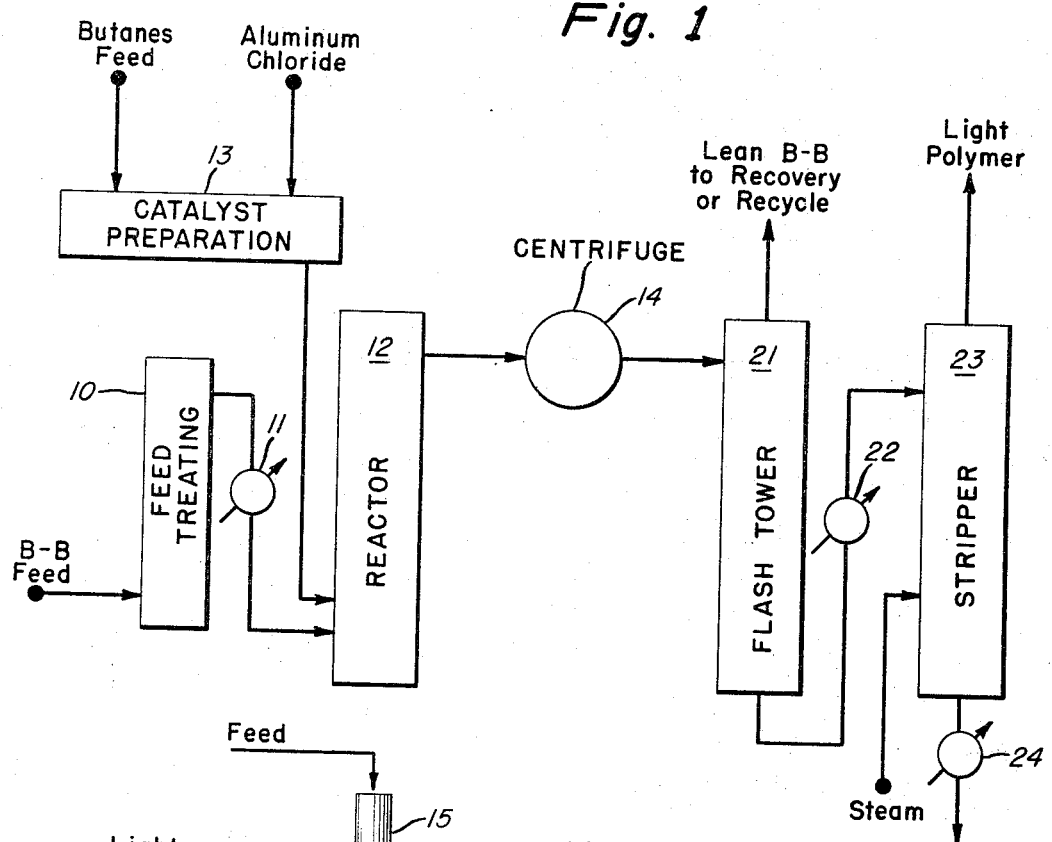

April 2, 1968     J. M. FEEZEL     3,376,360
PROCESS EMPLOYING CENTRIFUGAL SEPARATION OF A CATALYST
COMPLEX FROM POLYMERIZED HYDROCARBONS
Filed Nov. 27, 1963     2 Sheets-Sheet 1

INVENTOR.
James M. Feezel
BY
ATTORNEY

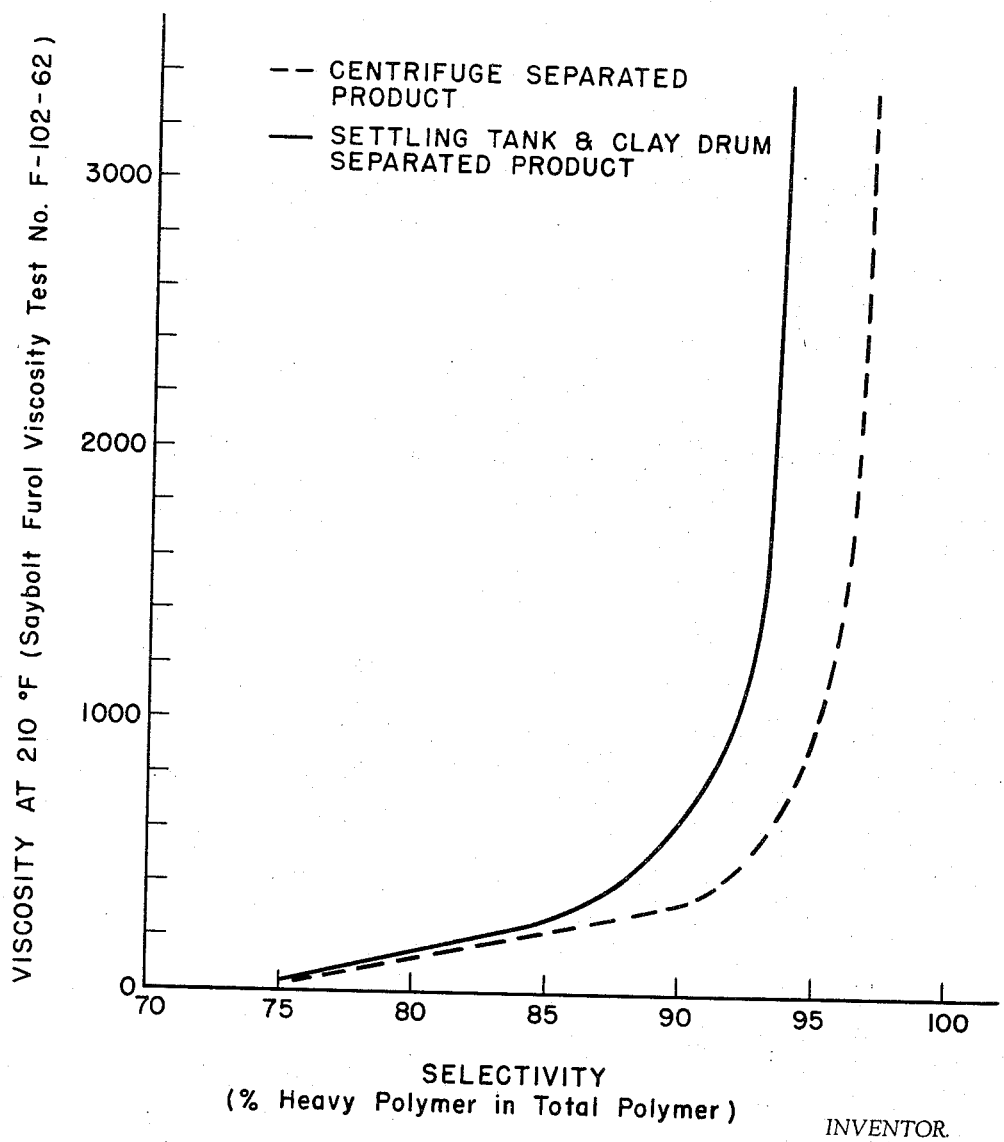

United States Patent Office 3,376,360
Patented Apr. 2, 1968

3,376,360
PROCESS EMPLOYING CENTRIFUGAL SEPARATION OF A CATALYST COMPLEX FROM POLYMERIZED HYDROCARBONS
James M. Feezel, Edwardsville, Ill., assignor to Standard Oil Company, Chicago, Ill., a corporation of Indiana
Filed Nov. 27, 1963, Ser. No. 326,585
7 Claims. (Cl. 260—683.15)

This invention relates to an improved process for polymerizing olefins with Friedel-Crafts type catalysts. In a more specific aspect, my novel process provides an improvement in the polymerization of propylene and butylene with an aluminum chloride-hydrocarbon complex catalyst and it pertains especially to an improved process wherein increased yields of heavy polymer and decreased yields of light polymer are realized in the polymerization of mixed butylenes from a butane-butylene refinery stream.

It has long been known that normally gaseous olefins can be converted to viscous liquid polymers by means of Friedel-Crafts type catalysts, such as boron trifluoride and aluminum chloride, and by means of the complex formed between a Friedel-Crafts catalyst and a hydrocarbon. Such catalysts have been particularly valuable in processes for ploymerizing normally gaseous olefins such as propylene, isobutylene, normal butenes, mixtures thereof, and the like. An object of this invention is to increase the proportion and quality of the heavy polymer fraction obtainable from a ploymerization reaction catalyzed with an aluminum chloride-hydrocarbon complex catalyst. Other objects will be apparent from the detailed description of the invention hereinbelow.

Briefly, the invention is a continuous liquid phase polymerization system involving a Friedel-Crafts type catalyst, dissolved and/or dispersed in a liquid hydrocarbon reaction phase which is contacted with liquid olefins at reduced temperatures resulting in olefin polymers and Friedel-Crafts type catalyst-hydrocarbon complex, wherein the complex is separated from the polymers by centrifugation. The polymers are then freed of unreacted hydrocarbons by flash distillation and subsequently fractionated to yield polymer fractions of desired molecular weight ranges.

While the invention is applicable to liquid phase polymerization of normally gaseous olefins such as propylene, isobutylene, normal butylenes, mixtures thereof, and the like, it is primarily directed to the polymerization of a butane-butylene mixture associated with butanes in a so-called butane-butylene refinery stream. A common charging stock of such description is a petroleum refinery butane-butylene stream containing about 26 weight percent isobutylene, about 37 weight percent normal butylenes, and about 36 weight percent butanes; such stocks usually also contain a small amount of propane, propylene, pentanes, pentenes, and the like.

In the usual process for the preparation of liquid viscous butylenes, a dried petroleum refinery butane-butylene stream or a similar charge stock from any other source is passed into the top of a saturator containing a bed of aluminum chloride catalyst. The butanes or other suitable hydrocarbon is passed downward through the bed of aluminum chloride catalyst at a rate such as to form an aluminum chloride-saturated solution of butanes containing, suitably, from about 4 lbs. to about 10 lbs. of aluminum chloride per barrel of the hydrocarbon leaving the bottom of the saturator. Such a catalyst preparation system is shown in U.S. Patent 2,970,179. Alternatively, the catalyst can be suspended in the hydrocarbon vehicle according to the procedure shown in U.S. Patent 2,677,002.

The effluent from the saturating or dispersing step and a dried butane-butylene stream, cooled by suitable heat exchange means to a temperature of from about 10° F. to about 30° F., suitably about 20° F., are separately introduced into the bottom of a polymerization reactor at a temperature of from about 0° F. to about 80° F., preferably from about 20° F. to about 40° F. The butane-butylene stream can be subjected to various desirable pretreatments, such as caustic washing, for removal of impurities. The temperature of the polymerization reactor is maintained at the desired point by suitable refrigeration means, such as propane or ammonia refrigeration. The reactor pressure is held sufficiently high to insure that liquid reaction conditions are maintained, such pressure being from about 50 to about 300 lbs. per square inch gauge, and more, and desirably from 100 to 200 lbs. per square inch gauge.

The aluminum chloride-hydrocarbon catalyst complex mixture and the butylenes feed are introduced into the reactor in the ratio of 0.5 to 1.5 lbs. of catalyst per 100 lbs. of olefin in the charging stock. The usual mode of operation then involves passing the reactor effluent consisting of polymerized butylenes, aluminum chloride-hydrocarbon complex and/or dispersed aluminum chloride and unreacted hydrocarbons to a settling tank wherein the major amount of the catalyst complex is settled out and withdrawn. It is important that this separation be as complete as possible so that hydrocarbon-catalyst complex, commonly termed "red oil," will not remain in the polymer-containing phase. Complex remaining in the polymer phase can cause after-reaction, wherein residual quantities of olefins continue to polymerize at progressively higher temperatures, as a consequence of bringing the reaction mixture to ambient temperature prior to flash separation of the product. This after-reaction can yield considerable amounts of undesirable low molecular weight material. Further, the red oil can cause discoloration and serious color instability of the desired butylenes polymer product.

To avoid and/or reduce the occurrence of secondary reaction and to thus avoid the production of undesired low molecular weight polymers, it has been proposed that the residual catalyst be quenched or destroyed before the reaction mixture warms up appreciably from the temperature of the refrigerated reaction. This has been accomplished by such expedients as ammonia, amines and sulfur dioxide. When the secondary reaction is prevented by catalyst quenching, the recovery of desired products from the polymerization reaction may be subjected to additional processing difficulties, since it is common practice to pass the effluent from the settling tank through a clay bed or other final filtering media to remove finely-divided materials from the polymer which are commonly referred to as "haze." Some of the added quenching compounds can react with residual catalyst complex to yield flocculent reaction products which rapidly reduce the flow rate through the filter beds by blocking the beds.

After the separation and removal of the residual aluminum chloride-hydrocarbon complex, the haze, and the particulate matter not separated in the settling tank, the filter bed effluent, which is now a clear butylenes polymer solution, is flash-distilled in a flash drum to remove unreacted hydrocarbons. The flash-tank bottoms cut is then passed to a stripping column for fractionation into the desired polymer fractions. The unreacted hydrocarbons taken overhead from the flash drum, and the catalyst separated in the settling tank, can be suitably recycled to the polymerization reactor in amounts necessary to obtain a reaction mixture of desired composition.

In my inventive process, the problem of after-reaction is solved without resort to chemical quenching agents injected into the polymer phase, which can themselves be the source of processing difficulties. Further, by inventive process can eliminate the need for settling tank and filter beds required by the ordinary polymerization process and greatly reduces the residence time of the butylenes in the process system, thus permitting closer control of product quality. Further, through the employment of my inventive process, the selectivity of the reaction is improved so that a larger yield of desirable heavy polymer is obtained, in relation to the yield of light polymer. By selectivity, I mean the volume percent of the desired heavy polymer in the total polymer produced; selectivities below 100% indicate that light polymer must be stripped out of total polymer to obtain the heavy polymer of desired average molecular weight. In general, the higher the conversion or the higher the reactor temperature, the lower is the selectivity.

In my inventive process, the effluent from the polymerization reactor is immediately introduced to a centrifuge wherein the heavier catalyst complex is separated from the lighter butylenes polymer solution fraction. This separation is effected in a much shorter time than the settling tank-clay drum separation and provides a rapid removal of catalyst complex so that after-reaction is greatly reduced. This reduction in after-reaction improves the selectivity of the polymerization. Such improvement is evident from the data presented in the working example set forth hereinbelow and in the table, wherein product obtained from a processing scheme which includes settling tank and clay drum separation is compared to product obtained from my novel processing scheme.

The invention will be more clearly understood from the following description, read in conjunction with the accompanying drawing which forms a part of this specification and which presents a schematic flow diagram of the improved process of this invention and of the improved separation means. While the ensuing example is described with respect to a specific polymerization operation involving butylenes, it should be understood that this is by way of illustration and that the invention is not limited thereto but is applicable to the polymerization of such other hydrocarbons as propylene, isobutylene, normal butenes, mixtures thereof, and the like.

The composition of a butane-butylene stream suitable for use in my inventive process may be varied throughout a relatively wide range, although it is preferred that the mixed butylenes constitute about 20% to 80% of the total charge and that both isobutylene and normal butylene be present to the extent of at least about 10%. It is important in all cases that the hydrocarbon be in the continuous phase in the stirred portion of the reactor and in some cases it may be advantageous to recycle a portion of the total hydrocarbon reactor effluent into the incoming charging stock. The butene-butylene feed stock is preferably washed with about 10% sodium hydroxide solution to remove mercaptan sulfur from the feed, which is a common contaminant in petroleum-derived feed stocks, in feed treating vessel 10, shown in FIGURE 1. This is then desirably passed through a drying step, being dried for example with calcium chloride. The thus dried feed stock is next passed through one or more heat exchangers or coolers 11, which cool the feed stream to a temperature in the range of about 0° F. to about 30° F., suitably about 20° F. This cooled feed stream is then passed to the bottom of the polymerization reactor 12 and charged thereto. A butane stream, essentially free of any water, is passed to a catalyst preparation vessel 13. This catalyst preparation vessel is charged with aluminum chloride through suitable means. The butane stream is preferably heated by means of a heat exchanger to a temperature in the range of 175 to 200° F., suitably about 180° F., and at a pressure around 400 p.s.i. absolute. An aluminum chloride-saturated hydrocarbon solution is thereby prepared.

The aluminum chloride may be added to the saturator in the form of lump or powdered anhydrous aluminum chloride and may be distributed throughout the saturator or maintained in beds or brought into intimate contact with the butanes hydrocarbons by other suitable means. Generally, at least two saturators will be used so that aluminum chloride-hydrocarbon solution can be drawn from one while the other is employed for the preparation of additional catalyst solution.

The effluent from the saturator consists of butanes having dissolved therein about 5 lbs. of aluminum chloride per barrel of butanes. This is passed into the bottom of reactor 12 wherein it is mixed with the butylenes feed by means of suitable agitation devices, such as stirring shafts, recirculating pumps, etc. The temperature of reactor 12 is maintained at about 20° F. through refrigeration.

The product effluent from the top of reactor 12 consists of polymerized butylenes, aluminum chloride-hydrocarbon complex which includes unreacted aluminum chloride and unreacted hydrocarbons. This is passed to centrifuge 14 wherein the bulk of the entrained catalyst complex is centrifuged away from the hydrocarbons fraction and the catalyst complex is disposed of or recirculated to the reactor, depending upon which course is more desirable in the particular operation.

Figure 2:
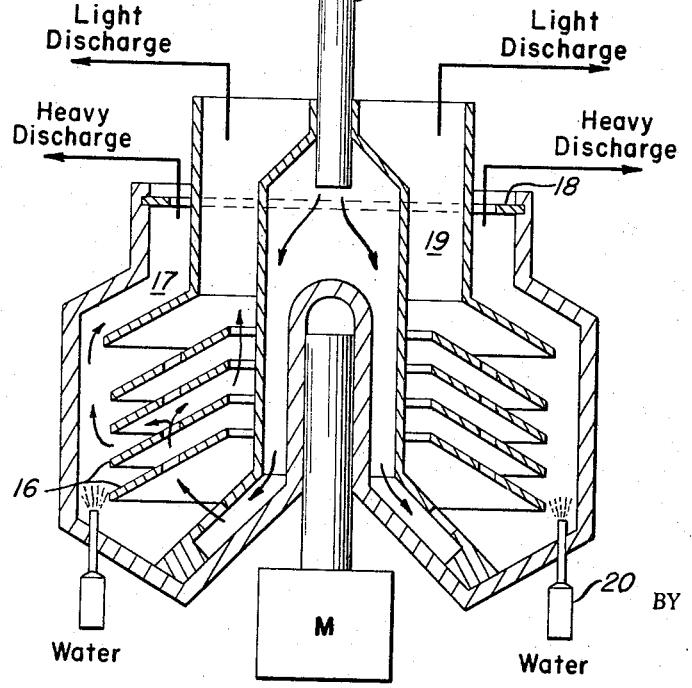

A diagram of a suitable centrifuge for the separation of catalyst complex and hydrocarbons stream is shown in FIGURE 2. The reactor effluent flows through intake pipe 15 into the body of the centrifuge and is distributed near the center of the centrifuge discs 16. The centrifuge operation is conducted according to methods well known to the centrifuge art. The heavier aluminum chloride-containing catalyst complex is thrown to the outer chamber 17 of the centrifuge and the discharge thereof is controlled by the dam 18. The size of the control dam and the speed of the centrifuge are adjusted so that a seal is constantaly maintained between the system and the atmosphere.

The lighter hydrocarbons phase is thrown to the centrifuge inner chamber 19. If a quantity of solids is included in the feed sufficient to hamper the operation of the usual liquid-liquid separating centrifuge, for example, aluminum powder included for the purposes of increasing the yield, a centrifuge incorporating solids discharge means may be employed. Further, in the operation of liquid-liquid separating centrifuges, it may be desirable that water, water-ammonia or caustic solution injection be provided at the centrifuge outer wall chamber, or other appropriate location on the water side of the interface, so that the aluminum chloride-catalyst complex can be decomposed and flushed from the centrifuge. Suitable water injection means are as shown by nozzle 20. Other materials capable of decomposing and flushing away the catalyst may also optionally be injected. The centrifuge structure may vary from that shown and the centrifuge may be equipped with internal concentric baffles or radial baffles, depending upon which provides more convenient operation. This will depend upon such variables as the amount of catalyst complex, the viscosity of the solution from the reactor, whether a water injection is employed, etc. I have found that desirable conditions of operation with a water-ammonia injection and a heavy polymer in the viscosity range of 20-5000 SSF at 210° F. (Saybolt Furol Viscosity Test No. F-102-62) are a hydrocarbon:water:ammonia ratio of 8:1:0.5, a centrifuge inlet pressure of 140 p.s.i.g., a centrifuge speed of 2300 r.p.m. corresponding to centrifuge force of 1500 at the feed port and an outlet pressure of 105 p.s.i.g. Desirable pressure differentials between centrifuge inlet and outlet can be from 10 to 60 p.s.i.g. and more. Centrifuge force can be varied over the range of 300 to 2500 G. Water injection, when used, should be performed in the heavy catalyst complex phase in the centrifuge, since decomposition of the catalyst complex releases the red oil hydrocarbons which cause serious discoloration of the product hydrocarbons, if included therein. When water injection is employed, the centrifugation operation is greatly simplified, as compared to centrifugation in which the heavy catalyst complex is recovered, and this is my preferred mode of operation. Unless it is particularly necessary and desirable that the catalyst complex be recovered for reuse, therefore, it is preferred that water injection be employed. The water injection simultaneously accomplishes decomposition of the aluminum chloride and springing of the red oil, and greatly simplifies handling of the now solubilized aluminum chloride hydrolysis products, which are then sent to waste disposal.

The centrifugation operation is so effective in preventing the formation of after-reaction products of lower molecular weight that it furnishes a simultaneous separation of catalyst and quenching of reaction, thus reducing or eliminating the necessity of a separate quenching operation. However, if a product of particularly high purity is desired, quenching chemicals, such as ammonia, amines, sulfur dioxide, and the like, may be introduced into the light discharge stream from the centrifuge. The necessity for such quenching is greatly diminished with hydrocarbon product from my inventive process as compared to the hydrocarbon effluent from the settling tanks employed in prior art operation, and when used to obtain especially stable product, need be used in very small amount. My inventive process provides a separation so complete that treatment of the hydrocarbon effluent with such chemical quenching agent is generally unnecessary.

The product effluent from centirfuge 14, consisting of clear butylenes polymer and unreacted hydrocarbons, is passed through suitable handling means to flash tower 21, shown in FIGURE 1, which operates at a pressure of about 100 p.s.i.g. with a temperature at the top of about 300° F. and a temperature at the bottom of about 320° F., maintained by suitable heating devices.

If desired, the hydrocarbon effluent from the centrifuge can be passed through a filter bed for clarification prior to introduction to the flash tower, where it is filtered through a suitable filtration bed such as sand, gravel, limestone or Attapulgus clay for removing entrained aluminum compounds.

In flash tower 21 the unreacted hydrocarbons, chiefly butylenes and butanes, are taken overhead for recovery and can, if desired, be passed to the butylenes feed line for recycle to the reactor.

From the base of flash tower 21, the polymer mixture passes through suitable heating means 22 to stripping tower 23. The heater 22 is used to raise the temperature of the polymer mixture to about 600° F.; it is generally desirable to add steam at about 110 lbs. pressure to the stripper in amount sufficient to facilitate the stripper tower operation. The stripping tower preferably operates at about atmospheric or reduced pressure. An inert gas is usually introduced at a point below the steam line to insure removal of steam from the heavier or bottom polymer fraction, which is withdrawn at a temperature of about 475° F. from the base of the stripper after being cooled in cooler 24 to about 200° F. A lighter polymer fraction is taken overhead from the stripper 23 and is recovered through suitable condensing means.

Depending upon reaction conditions and the stripping temperatures employed in stripper 23, polymer fractions of varying molecular weights are obtainable, which can be blended together in various proportions to yield a series of polymers of different molecular weights, varying from about 300 to about 1000 or more.

While it is generally preferable for purposes of efficient operation to charge to the reactor a solution of aluminum chloride catalyst in liquid butanes, it may be desirable under certain circumstances to employ the aluminum chloride in the form of a slurry with light polymer recycled from stripper 23 by suitable means. Aluminum chloride, preferably in the form of powder of about 40 mesh or smaller, is slurried with the preferably dried, recycled light polymer in the approximate ratio of about 0.3 lb. aluminum chloride to each gallon of the recycled light polymer. Such aluminum chloride slurry is a relatively non-viscous suspension of aluminum chloride. Since it is prepared at ordinary temperature in the absence of added hydrogen chloride, in the short time before the slurry enters the reactor it does not complex with the light polymer in which it is slurried; on entry to the reactor it combines with the already-formed complex to fortify it.

Product quality comparisons were made for polybutenes produced by the conventional process scheme employing a settling tank and two clay drums in series for product separation and purification. The data presented in the table represent the average of results from 35 samplings of good settling tank-clay drum operation and 24 samplings of centrifuge operation. There are occasional periods of extreme after-reaction in the clay drums when color degradation and loss of heavy polymer yield are severe; the uniformly good operation possible with centrifugal separation constitutes a distinct advantage of the centrifugal separation process over the settling tank-clay drum separation. Periods of extreme after-reaction were not included in the samplings for comparison of the two processes; these were omitted in order that the data show the advantage of centrifugal separation even compared to good settling tank-clay drum separation.

The centrifugal was operated, according to my preferred procedure, with injection of water and ammonia into the catalyst complex phase. No post centrifuge treatment was given the centrifuge effluent, other than flashing to remove light polymer, which operation was also performed upon the clay drum effluent.

The color stability of heavy polymer product was determined by measuring color increase with a Fisher electrophotometer, in optical density units per minute, for product exposed to oxygen at an elevated temperature.

TABLE

| Heavy Polymer Test | Centrifuge [1] | Settling Tank-Clay Drum [2] |
|---|---|---|
| Color Stability [3] (ODU/min.): | | |
| Average | 0.19 | 0.29 |
| Minimum | 0.06 | 0.03 |
| Maximum | 0.86 | 0.72 |

[1] 24 samples.
[2] 35 samples.
[3] Higher numbers indicate greater color.

It is apparent from the above results that the color stability of heavy polymer product recovered by my inventive process is, on the average, better than that of product recovered by common prior art technique. This difference amounts to a 34 percent improvement, on an average for multiple comparison samples. To ensure that differences in results arose from the separation procedures employed, and not from differences in polymerization reaction conditions, the samples tested were obtained by channeling part of a reactor effluent stream to a centrifuge, and another part to a separator and clay drums in series. Thus the similarity of the reactor effluent subjected to the two separation procedures was assured and the differences noted can arise only from the separation procedures.

As mentioned hereinabove, a major advantage of my inventive process is an improvement in selectivity of the product. This appears to be a result of minimizing after-reaction in the product stream through rapid separation of catalyst complex and product. The improvement in selectivity is shown graphically in FIGURE 3, where the selectivities for products recovered by centrifugation and ordinary separation are plotted for multiple samples of total products of comparable viscosity, at different viscosities. The improvement ranges from about one percent at low viscosities to three percent at higher viscosities. Though this percentage improvement is low, it represents an appreciable economic advantage because of the large volumes of polymer produced in commercial operation, as will be appreciated by those of ordinary skill in this art.

While the invention has thus been described with respect to a specific polymerization operation involving butylenes, it should be understood that this is by way of illustration only, and that the invention is not limited thereto, but is applicable to the polymerization of normally gaseous olefins polymerizable with Friedel-Crafts catalysts, such as propylene, isobutylene, normal butenes, pentenes and mixtures thereof, and the like.

Having thus described my inventive process, what I claim is:

1. In the process which comprises polymerizing normally gaseous olefins in a polymerization zone with Friedel-Crafts catalyst, whereby there is formed olefin polymer in admixture with Friedel-Crafts catalyst-hydrocarbon complex, withdrawing from said polymerization zone the admixture of said polymer and said complex and separating said admixture, the improvement which comprises separating said admixture by centrifuging immediately upon withdrawal of said admixture from said polymerization zone so as to minimize polymerization and discoloration of olefin polymer occurring subsequent to said polymerization zone.

2. The process of claim 1 wherein the Friedel-Crafts catalyst comprises aluminum chloride.

3. The process of claim 2 wherein the normally gaseous olefin comprises a mixture of n-butylene and isobutylene.

4. In the process which comprises polymerizing normally gaseous olefins in a polymerization zone with Friedel-Crafts catalyst, whereby there is formed olefin polymer in admixture with Friedel-Crafts catalyst-hydrocarbon complex, withdrawing from said polymerization zone the admixture of said polymer and said complex and separating said admixture, the improvement which comprises separating said admixture by centrifuging immediately upon withdrawal of said admixture from said polymerization zone and introducing water into a separated complex phase during centrifuging so as to decompose and dissolve a substantial part of said complex.

5. The process of claim 4 wherein the Friedel-Crafts catalyst comprises aluminum chloride.

6. The process of claim 5 wherein the normally gaseous olefin comprises a mixture of n-butylene and isobutylene.

7. In the process which comprises polymerizing a mixture of butylenes, in which isobutylene and normal butylene are each present to the extent of at least about 10 percent, by means of an aluminum chloride catalyst, to form a liquid polybutylene polymer, wherein said butylenes are mixed with said aluminum chloride catalyst in a polymerization zone, whereby there is formed liquid polybutylene polymer in admixture with aluminum chloride catalyst-hydrocarbon complex, and said admixture is withdrawn from said polymerization zone and separated into a complex phase and a hydrocarbon phase, and said hydrocarbon phase is separated and subjected to a flash distillation for the removal of light hydrocarbons, thus providing a liquid butylene polymer, the improvement which comprises separating said admixture by centrifuging immediately upon withdrawal of said admixture from said polymerization zone, in which centrifuging step the inlet pressure is from about 10 to about 60 p.s.i.g. in excess of the outlet pressure, the centrifugal force amounts to about 300 to 2500 G. at the centrifuge feed port and said complex phase separated by the centrifuging is subjected to treatment with water and ammonia in the ratio of about one part water to one-half part ammonia.

References Cited

UNITED STATES PATENTS 3,190,938  6/1965  Edwards _____ 260—683.15
3,200,170  8/1965  Nichols _____ 260—683.15

OTHER REFERENCES

Perry: "Chemical Engineers' Handbook," 3rd edition, 1950, McGraw-Hill, New York, N.Y., p. 1008–13.

Badger and Banchero: "Introduction to Chemical Engineering," McGraw-Hill, New York, N.Y., 1955, p. 599.

DELBERT E. GANTZ, *Primary Examiner.*

R. H. SHUBERT, G. J. CRASANAKIS,
*Assistant Examiners.*